United States Patent [19]

Schimmel et al.

[11] Patent Number: 5,211,930
[45] Date of Patent: May 18, 1993

[54] PROCESS FOR THE PREPARATION OF CRYSTALLINE SODIUM SILICATES HAVING A SHEET STRUCTURE

[75] Inventors: Günther Schimmel; Reinhard Gradl, both of Erftstadt; Martin Schott, Steinbach, all of Fed. Rep. of Germany

[73] Assignee: Hoechst Aktiengesellschaft, Frankfurt am Main, Fed. Rep. of Germany

[21] Appl. No.: 693,782

[22] Filed: Apr. 26, 1991

Related U.S. Application Data

[63] Continuation of Ser. No. 515,664, Apr. 25, 1990, abandoned, which is a continuation of Ser. No. 195,762, May 18, 1988, abandoned.

[30] Foreign Application Priority Data

Jun. 1, 1987 [DE] Fed. Rep. of Germany ....... 3718350

[51] Int. Cl.$^5$ ............................................ C01B 33/32
[52] U.S. Cl. .................................... 423/333; 423/326; 423/332; 423/334
[58] Field of Search ................ 423/325, 333, 334, 332

[56] References Cited

U.S. PATENT DOCUMENTS

| 3,208,822 | 9/1965 | Baker et al. | 23/313 AS |
|---|---|---|---|
| 3,377,134 | 4/1968 | Baker et al. | 423/332 |
| 3,687,640 | 8/1972 | Sams et al. | 423/332 |
| 3,748,103 | 7/1973 | Bean et al. | 423/332 |
| 3,884,645 | 5/1975 | Kinne | 423/334 |
| 3,918,921 | 11/1975 | Pierce | 423/332 |
| 4,173,622 | 11/1979 | Robertson | 423/329 |
| 4,585,642 | 4/1986 | Rieck | 423/333 |
| 4,664,839 | 5/1987 | Rieck | 252/175 |

FOREIGN PATENT DOCUMENTS 57-175725 10/1982 Japan ................... 423/332

Primary Examiner—R. Bruce Breneman
Attorney, Agent, or Firm—Connolly & Hutz

[57] ABSTRACT

For the preparation of crystalline sodium silicates having a sheet structure and an $SiO_2/Na_2O$ molar ratio of 1.9:1 to 3.5:1 from waterglass solutions having a solids content of 20 to 65% by weight, the waterglass solutions are first treated in a spray-drying zone. This gives a pulverulent amorphous sodium silicate having a maximum ignition loss of 20% by weight, while the waste gas leaving the spray-drying zone is at a temperature of at least 140° C. Thereafter, the spray-dried sodium silicate is heated in an ignition zone containing an agitated solid bed at temperatures of 500° to 800° C. for 1 to 60 minutes in the presence of at least 10% by weight of recycled material. This recycled material was obtained by mechanical comminution of crystalline sodium silicate discharged from the ignition zone.

1 Claim, No Drawings

PROCESS FOR THE PREPARATION OF CRYSTALLINE SODIUM SILICATES HAVING A SHEET STRUCTURE

This application is a continuation of application Ser. No. 07/515,664, filed Apr. 25, 1990, now abandoned, which in turn is a continuation of application Ser. No. 07/195,762, filed May 18, 1988, now abandoned.

The present invention relates to a process for the preparation of crystalline sodium silicates having a sheet structure and an $SiO_2/Na_2O$ molar ratio of 1.9:1 to 3.5:1 from waterglass solutions having a solids content of 20 to 65% by weight.

In the process for the preparation of crystalline sodium silicates according to U.S. Pat. No. 4,585,642, a small amount of crystalline sodium silicate is added to liquid or solid sodium disilicate having a water content of 5 to 95% by weight before water is removed from the reaction mixture and the latter is kept at a temperature of 450° C. to just below the melting point until the total amount of sodium silicate has crystallized.

Furthermore, U.S. Pat. No. 4,664,839 discloses that, among the various crystal modifications of crystalline sheet silicates of the formula $Na_2Si_2O_5$, the δ-form has the highest cation exchange power and is therefore particularly suitable for softening water.

A disadvantage of the known process is that a solid bulky silicate foam is formed during removal of water from the amorphous sodium silicate. Moreover, during heating of the dehydrated sodium silicate, a temperature range of 580° to 630° C. is employed, in which, owing to an exothermic reaction, the sodium silicate melts for a short time and forms extremely hard, bulky aggregates. In both process steps, there is therefore the danger that continuously operating apparatuses will become blocked. Finally, milling of the particular product, which is required in both process steps, entails considerable expense.

It is therefore the object of the present invention to provide a process which permits trouble-free continuous preparation of crystalline sodium silicate having a sheet structure in the δ-modification from waterglass solutions with little mechanical comminution. This is achieved, according to the invention, if a) the waterglass solutions are treated in a spray-drying zone with formation of a pulverulent amorphous sodium silicate with a maximum ignition loss of 20% by weight, the waste gas leaving the spray-drying zone being at a temperature of at least 140° C., and b) the spray-dried sodium silicate is heated in an ignition zone containing an agitated solid bed at temperatures of 500° to 800° C. for 1 to 60 minutes in the presence of at least 10% by weight of a recycled material obtained by mechanical comminution of crystalline sodium silicate discharged from the ignition zone.

Alternatively, in the process according to the invention it is also possible a) for up to 50% by weight of crystalline sodium silicate discharged from the ignition zone to be recycled to the ignition zone after mechanical comminution;

b) for the mechanically comminuted, crystalline sodium silicate to have particle sizes of 10 to 1,000 μm;

c) for spray-drying of the waterglass solutions and heating of the sodium silicate to be carried out together in a directly fired rotary tubular kiln;

d) for the waterglass solutions to be sprayed in at the non-fired end of the rotary tubular kiln, while the heated sodium silicate emerges at the fired side of the rotary tubular kiln;

e) for the rotary tubular kiln to be inclined 0.5° to 5°, preferably 1° to 2°, to the horizontal;

f) for the spray-dried sodium silicate to have a maximum ignition loss of 5% by weight;

g) for the amount of crystalline sodium silicate recycled to the ignition zone to be the greater the higher the ignition loss of the spray-dried sodium silicate.

The crystalline sodium silicates obtained using the process according to the invention have pH values of 10.0 to 10.5 and a calcium-binding power of more than 360 meq Ca/100 g (at 20° C.) or more than 600 meq Ca/100 g (at 60° C.) while their magnesium-binding power in the same pH range is more than 580 meq Mg/100 g (at 20° C.) or more than 1,000 meq Mg/100 g (at 60° C.).

In the process according to the invention, the quality of the resulting amorphous sodium disilicate powder can be influenced in a wide range in the course of the spray-drying by changing the concentration of the waterglass solution and by controlling the spraying temperature. Thus for example, the amorphous sodium silicate powders to be treated according to the invention in the ignition zone and having a water content of 1 to 20% by weight can be prepared in a hot-air spray tower from waterglass solutions having a modulus ($SiO_2:Na_2O$ ratio) of 2.

Advantageously, the process according to the invention can be carried out in a single apparatus which permits the steps comprising spraying of the waterglass solution, heating in an agitated bed and recycling of the crystalline sodium silicate into the ignition zone. This can be carried out in a fluidized bed reactor or a rotary tubular kiln operated with hot gas, into which waterglass solution is sprayed and into which crystalline sodium silicate is simultaneously metered in. A rotary tubular kiln fired directly with oil or gas is preferred, in which case the feed and discharge can be arranged at different positions, and, depending on the inclination of the furnace with respect to the horizontal, discharge is effected after a shorter or longer heating time.

In the examples which follow and in which the invention is described in detail, the calcium- and magnesium-binding power of the resulting crystalline sodium silicates having a sheet structure are determined as follows:

Solutions of $CaCl_2$ (corresponding to 300 mg of CaO) or $MgCl_2$ (corresponding to 216 mg of MgO) are added to 1 l of distilled water, with the result that a water having 30° German hardness was obtained.

1 g of the crystalline sodium silicate obtained in Examples 2 to 7 and 0 to 6 ml of 1-molar glycine solution (obtained from 75.1 g of glycine and 58.4 g of NaCl which were dissolved in water and made up to 1 l) were added to 1 l of this water, which had been heated to either 20° or 60° C., and the pH value was then adjusted to 10.4. The suspension was stirred for 30 minutes, during which the pH remained stable. Finally, the solution was filtered and the calcium and magnesium remaining in solution were determined complexometrically in the filtrate. The calcium- and magnesium-binding power were determined by calculating the difference with respect to the original contents.

The results for Examples 2 to 7 are summarized in the attached table.

EXAMPLE 1 (COMPARATIVE EXAMPLE)

Amorphous sodium disilicate which had an ignition loss of 19% was produced from a waterglass solution having a solids content of 45% and a modulus of 2 in a hot-air spray tower (waste gas temperature: 145° C.). The amorphous sodium disilicate was metered into the end wall of a rotary tubular kiln heated electrically from the outside (length: 3 m; diameter: 22 cm; inclination: 1.6°) via a metering screw at a rate of 2 kg/h, the residence time in the furnace being about 45 minutes and the temperature at its hottest point being 720° C.

After the material had initially expanded considerably in the rotary tubular kiln, it began to adhere to the walls on reaching the zone at about 550° C., large leaves being formed, and rolling up to give lumps of about 10 cm diameter. The rotary tubular kiln was blocked by the lumps to such an extent that the material flow in the furnace could be maintained only by constant poking. After an operating time of 2 hours, the cross-section of the rotary tubular kiln was virtually completely blocked, so that the experiment had to be discontinued.

EXAMPLE 2 (COMPARATIVE EXAMPLE)

The amorphous sodium disilicate was prepared as in Example 1. The amorphous sodium disilicate was fed via a metering screw into a directly fired rotary tubular kiln (length: 5 m; diameter: 78 cm; inclination: 1.2°) at its end opposite the flame, while the crystalline product was discharged at the flame end. 25 kg/h of amorphous sodium disilicate were metered; the temperature at the hottest point of the rotary tubular kiln was 740° C.

Material adhered to the wall of the rotary tubular kiln and had to be forced off mechanically. Agglomerates formed having a diameter up to about 20 cm.

EXAMPLE 3 (COMPARATIVE EXAMPLE)

The procedure was similar to Example 2; however, 60 kg/h of amorphous sodium disilicate and at the same time 5 kg/h of a recycled material obtained by comminuting the product obtained in Example 2 to less than 250 μm were metered.

Material adhered only weakly to the wall of the rotary tubular kiln and could be removed by occasional tapping. The largest agglomerates occurring had a diameter of about 8 cm.

EXAMPLE 4 (ACCORDING TO THE INVENTION)

Example 3 was repeated with the modification that 15 kg/h of recycled material were metered.

No material adhered to the wall of the rotary tubular kiln the crystalline sodium silicate discharged was substantially pulverulent.

EXAMPLE 5 (ACCORDING TO THE INVENTION)

A waterglass solution having a solids content of 55% and a modulus of 2 was spray-dried in a hot-air spray tower, the waste gas temperature being 230° C. and an amorphous sodium disilicate having an ignition loss of 4.7% being obtained.

The amorphous sodium disilicate was metered at a rate of 40 kg/h, together with 4 kg/h of recycled material, into a gas-fired rotary tubular kiln (inclination: 1.2°) No caking occurred in the rotary tubular kiln; the discharged crystalline sodium silicate was substantially pulverulent.

EXAMPLE 6 (ACCORDING TO THE INVENTION)

The waterglass solution according to Example 5 was sprayed through the flame of a directly fired spray tower. An amorphous sodium disilicate having an ignition loss of 1.4% was obtained at a waste gas temperature of 450° C. The amorphous sodium disilicate was heated together with the recycled material, as stated in Example 5. In this case too, no caking occurred in the rotary tubular kiln and a substantially pulverulent sodium silicate resulted.

EXAMPLE 7 (ACCORDING TO THE INVENTION)

The rotary tubular kiln described in Example 2 was additionally equipped, on its product-inlet side, with a spray system through which 50 l/h of a 50% strength waterglass solution were sprayed. At the same time, 5 kg/h of recycled material were introduced via a solids metering system, cocurrently with the sprayed waterglass solution. The waste gas temperature was 220° C. and the temperature at the hottest point of the rotary tubular kiln was 750° C. The primary spray product had an ignition loss of 4.8%. No material adhered to the wall of the rotary tubular kiln. The largest agglomerates in the discharged crystalline sodium had a diameter of about 3 cm.

TABLE

Calcium- and magnesium-binding power of crystalline sodium silicates having a sheet structure at pH 10.4

| According to Example | Calcium-binding power [mgCa/g] | | Magnesium-binding power [mgMg/g] | |
|---|---|---|---|---|
| | at 20°C. | at 60°C. | at 20°C. | at 60°C. |
| 2 | 68 | 114 | 66 | 120 |
| 3 | 72 | 120 | 70 | 124 |
| 4 | 74 | 123 | 72 | 128 |
| 5 | 78 | 126 | 74 | 130 |
| 6 | 76 | 124 | 74 | 130 |
| 7 | 75 | 124 | 73 | 128 |

We claim:

1. In a process for the preparation of crystalline sodium silicate having a sheet structure and an $SiO_2/Na_2O$ molar ratio ranging from (1.9 to 3.5):1 from waterglass solution having a sodium silicate content of 20 to 65% by weight comprising
   a) spray-drying the waterglass solution in a spray-drying zone to form an amorphous sodium silicate having a maximum ignition loss of 20% by weight, exhaust gas leaving said spray-drying zone having a temperature of at least 140° C.;
   b) heating in an annealing zone the spray-dried amorphous sodium silicate of step (a) in a rotary tubular kiln inclined 1° to 5° from the horizontal at temperatures ranging from 500° C. to 800° C. for 1 to 60 minutes in order to effect crystallization of said amorphous sodium silicate; and
   c) recovering said crystalline sodium silicate from said rotary tubular kiln;
   the improvement consisting essentially of adding 10 weight-% to 50 weight-%, based on the weight of said amorphous sodium silicate, of crystalline sodium silicate obtained by mechanical comminution to the annealing zone in step b) so as to prevent adherence of any material to the walls of said rotary tubular kiln and thereby enable continuous recovery of pulverulent product in step (c).

* * * * *